US012726393B2

(12) United States Patent
Nory et al.

(10) Patent No.: US 12,726,393 B2
(45) Date of Patent: Sep. 1, 2026

(54) WAVEFORM INDICATION IN WIRELESS COMMUNICATION NETWORKS

(71) Applicant: TELEFONAKTIEBOLAGET LM ERICSSON (PUBL), Stockholm (SE)

(72) Inventors: Ravikiran Nory, San Jose, CA (US); Robert Baldemair, Solna (SE); Daniel Chen Larsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/943,422

(22) Filed: Sep. 13, 2022

(65) Prior Publication Data

US 2024/0097959 A1 Mar. 21, 2024

(51) Int. Cl.

| | |
|---|---|
| ***H04K 1/10*** | (2006.01) |
| ***H04L 5/00*** | (2006.01) |
| ***H04L 27/26*** | (2006.01) |
| ***H04L 27/28*** | (2006.01) |

(52) U.S. Cl.

CPC ........ *H04L 27/2636* (2013.01); *H04L 5/0048* (2013.01); *H04L 5/0055* (2013.01)

(58) Field of Classification Search

CPC . H04L 27/2636; H04L 5/0048; H04L 5/0055; H04L 5/0051; H04L 5/0094

USPC ......................... 375/260, 219, 220, 295, 316

See application file for complete search history.

(56) References Cited

U.S. PATENT DOCUMENTS

| | | | | |
|---|---|---|---|---|
| 11,451,357 | B2 * | 9/2022 | Nory | H04L 5/0051 |
| 2010/0034152 | A1 | 2/2010 | Imamura | |
| 2013/0195275 | A1 * | 8/2013 | Koivisto | H04L 1/06 380/287 |
| 2017/0150523 | A1 | 5/2017 | Patel | |
| 2018/0249487 | A1 * | 8/2018 | Takeda | H04L 27/2636 |
| 2019/0334751 | A1 * | 10/2019 | Liu | H04L 5/0094 |

FOREIGN PATENT DOCUMENTS

| | | | |
|---|---|---|---|
| CN | 101662829 | B | 2/2013 |
| CN | 103283283 | A | 9/2013 |
| CN | 102577218 | B | 12/2014 |
| CN | 104938007 | B | 8/2019 |
| JP | 2011223111 | A | 11/2011 |

(Continued)

OTHER PUBLICATIONS

Nokia, Alcatel-Lucent Shanghai Bell, 3GPP TSG-RAN WG1 NR AH, Contention-based grant-free transmission for URLLC, R1-1701026, Spokane, WA, USA, Jan. 16-20, 2017.

(Continued)

*Primary Examiner* — Phuong Phu

(57) ABSTRACT

Methods and related radio network nodes and user equipment are described for the indication of waveform in wireless communication networks. The methods include, and related radio network nodes and user equipment adapted to, receiving a downlink transmission from a radio network node, where the downlink transmission having at least one characteristic; selecting one waveform from two or more waveforms for an upcoming uplink transmission to the radio network node, where the waveform being selected based at least in part on the at least one characteristic of the downlink transmission; and transmitting the uplink transmission to the radio network node using the selected waveform.

8 Claims, 15 Drawing Sheets

(56) References Cited

FOREIGN PATENT DOCUMENTS

| | | | |
|---|---|---|---|
| JP | 2013507843 | A | 3/2013 |
| WO | 2009020423 | A1 | 2/2009 |
| WO | 2016171765 | A1 | 10/2016 |

OTHER PUBLICATIONS

Ericsson, “On MCS/transport Block Size Determination for PUSCH”, 3GPP TSG-RAN WG1 Meeting #89, R1-1709096, Hangzhou, China, May 15-19, 2017.

* cited by examiner

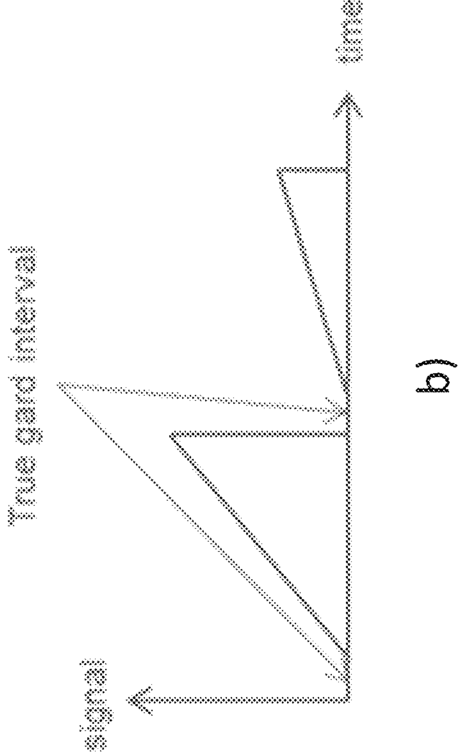
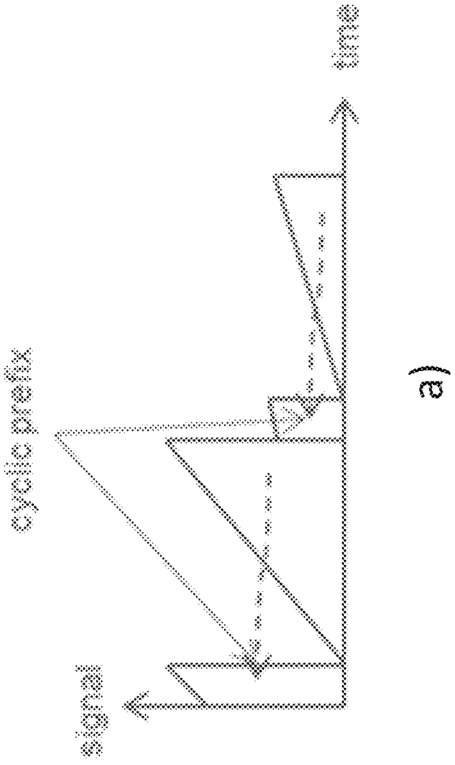
Fig. 2

Data

Tx Ctrl

Rx Ctrl

Data

Rx Ctrl

Tx Ctrl

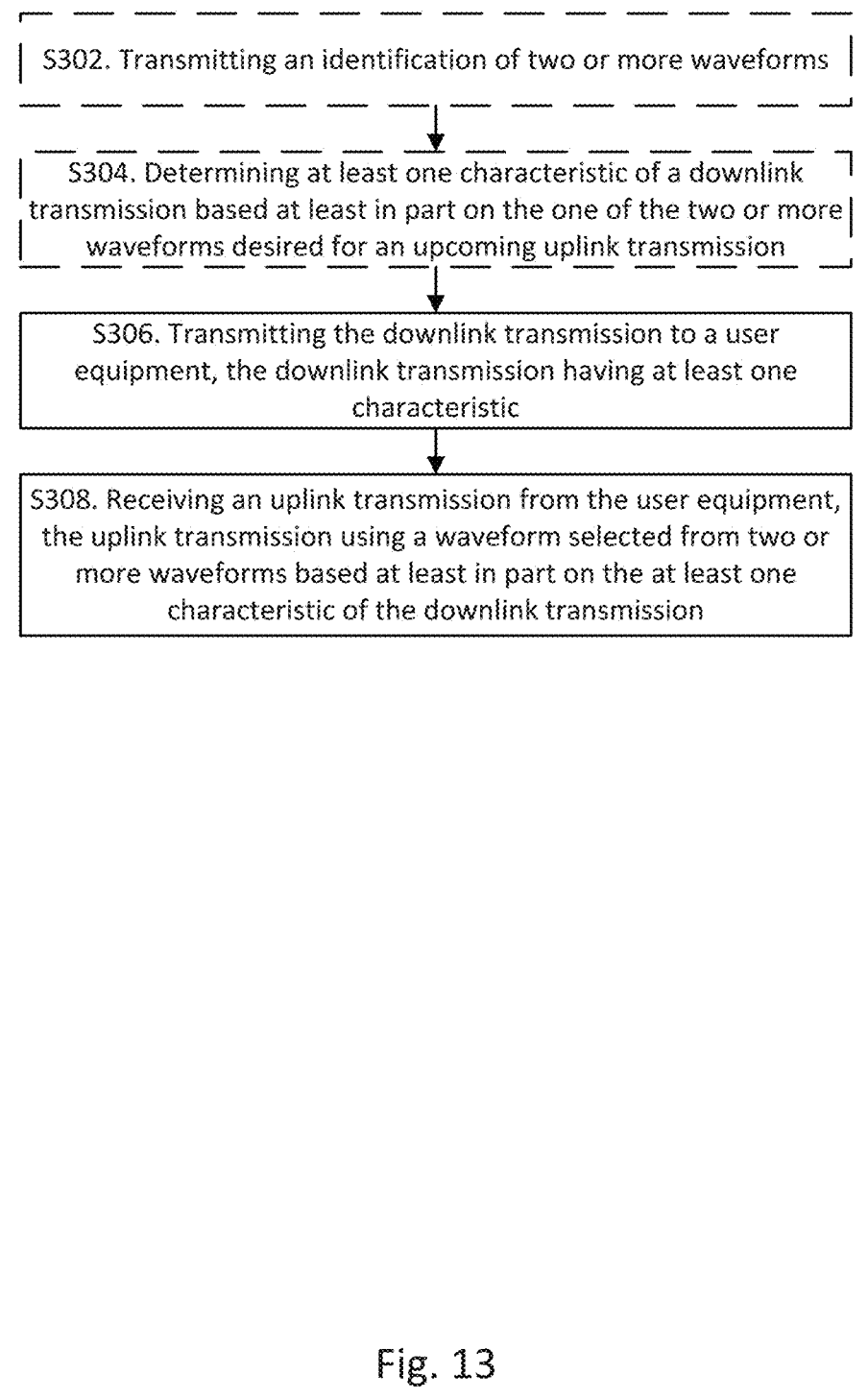

S302. Transmitting an identification of two or more waveforms

S304. Determining at least one characteristic of a downlink transmission based at least in part on the one of the two or more waveforms desired for an upcoming uplink transmission S306. Transmitting the downlink transmission to a user equipment, the downlink transmission having at least one characteristic S308. Receiving an uplink transmission from the user equipment, the uplink transmission using a waveform selected from two or more waveforms based at least in part on the at least one characteristic of the downlink transmission

Fig. 13

WAVEFORM INDICATION IN WIRELESS COMMUNICATION NETWORKS

RELATED APPLICATIONS

This application is a continuation of U.S. patent application Ser. No. 16/621,922 filed on Dec. 12, 2019, which was a 371 International Patent Application PCT/IB2018/054478 filed on Jun. 18, 2018, which claims the priority and benefit of U.S. Patent Application 62/521,157, filed Jun. 16, 2017.

TECHNICAL FIELD

The present description generally relates to wireless communications and wireless communication networks, and more particularly relates to waveform indication in wireless communication networks.

INTRODUCTION

Transmissions in radio communication systems is often organized in terms of frames (or sometimes subframes), where each frame is a group of transmission resources (e.g. radio time and frequency resources) that contains both (at least) one control field and (at least) one payload data field. Typically, the control field appears at the beginning of the frame and contains, e.g., information about how the data part of the frame is encoded and modulated. The control field may also contain information related to data transmission in the reverse link direction (i.e. data transmitted from the receiver of the control information), e.g. ACK/NACK reports or channel state information.

Half-Duplex

If a communication system does not use paired spectrum (different frequency bands for the two link directions), as millimeter-wave (mmWave) systems typically will not do, it is normally necessary to limit communication to half-duplex, i.e. transmission can at any one time instance occur only in one of the two link directions. Hence, time-division duplex (TDD) has to be used. One reason for this limitation is that a radio node, e.g. a radio network node or a user equipment that is transmitting saturates its own analog receiving circuitry due to strong overhearing between transmit and receive antennas. In half-duplex systems, it may be useful to have two fields for control information in every frame, one for one link direction, and one for the other. The two directions of a link will henceforth be referred to as Tx/Rx directions, or sometimes the two duplex directions. In other words, any given node uses one of the fields for transmission (Tx) and the other field for reception (Rx).

Precoded Multi-Carrier Signal

In precoded multi-carrier signaling a multi-carrier modulator (e.g. OFDM, but could be any other multi-carrier modulation scheme such as FBMC) is not directly fed with data in the frequency domain but data are first precoded and then applied to the subcarriers of the multi-carrier modulator.

Such a scheme is illustrated in FIG. 1.

The precoding transformation can be any precoder that enables a certain desired property at the output of the multi-carrier modulator; very often the precoding is used to generate a low Peak-to-Average Power Ratio (PAPR) signal at the output of the multi-carrier modulator. If the multi-carrier modulator is an OFDM modulator, a common choice of precoder is the Discrete Fourier Transform (DFT). In this case, the precoded multi-carrier scheme is the well-known DFTS-OFDM signaling scheme used in the uplink in LTE networks.

If the multi-carrier modulator is FBMC, a choice that reduces PAPR at the output of the FBMC modulator is to perform precoding with a filter bank transformation.

In case of DFTS-OFDM, the output signal for block i can be written as (omitting the subscript i for simplicity)

$$y = F_N^H S F_M x$$

with $F_M$ and $F_N$ the DFT matrices of size M and N, respectively. M is the number of allocated subcarrier and N is the IDFT size of the OFDM modulator. The N×M matrix S maps the output of the spreading operations to the M allocated subcarriers and has exactly one 1 and otherwise only 0 in each column. For a contiguous mapping of the M subcarriers we have $$S = \begin{bmatrix} 0_{L_{0_1}} \\ I_M \\ 0_{L_{0_2}} \end{bmatrix}$$

with the M×M identity matrix $I_M$ and $$0_{L_{0_1}} \text{ and } 0_{L_{0_2}}$$

all zero matrices of size $Lo_1$×M and $L_{0_2}$ ×M, respectively. Non-contiguous mappings such as interleaved mapping are possible as well.

The data vector to transmit is the M element vector x.

Typically, a guard interval is prefixed to y to enable simple frequency-domain equalization at the receiver. As shown in FIG. 2, the guard interval can either be a true guard interval (an L-element long zero vector) or a cyclic prefix (copy of the last L elements of y). In both cases, the signal with guard interval can be written as $$\tilde{y} = Py = PF_N^H S F_M x$$

with P the matrix inserting the true guard interval or cyclic prefix.

Frame Structure

A possible frame structure of a communication system is illustrated in FIG. 3. Any two nodes communicating may in principle arbitrarily select which of the two control fields should be used for Tx and for Rx (see left and right panels of FIG. 3). However, such arbitrariness may require complicated negotiation procedures and hence it is often more practical to have a general rule for the system, e.g. that one of the fields is always used for DL Tx, i.e. Tx by radio network nodes, whereas the other field is always used for UL Tx, i.e. Tx by UEs (see left and right panels of FIG. 4). Note also that frames on different links in the system should preferably be time-aligned, partly because this enables nodes to more freely and efficiently change communication partner (node) from one frame to another, without waiting for the another communication link to finish its frame.

Fields are in most transmission systems further divided into smaller units, e.g. in OFDM-based systems, the fields would be further divided into one or more OFDM symbols. Similar holds e.g. for systems based on DFTS-OFDM, FBMC, etc. Such units may be generally referred to as symbols. Some fields may consist of only a single symbol.

Other Signals and Fields in and Between Frames

It should be noted that within each of the three fields, there may typically also be other signals interspersed, e.g. reference signals (or pilot signals) to allow the receiver to perform channel estimation.

MCS and TBS Determination

For an initial transmission of an LTE PUSCH, an MCS index, $I_{MCS}$, is signalled in the DCI to the UE. The UE uses the received $I_M$CS as the row key to read off modulation order, Qm, and TBS index, $I_{TBS}$, from an MCS table specified in TS 36.213. To determine the TBS, the UE first calculates the total number of allocated PRBs, $N_{PRB}$. The UE then determines the TBS from a TBS table specified in TS 36.213 using $I_{TBS}$ as row key and $N_{PRB}$ as column key.

In case of retransmission, the radio network node (e.g. a eNB in LTE) can elect to signal a modulation order to the UE and the UE shall assume the TBS determined from DCI transported in the latest PDCCH for the same transport block using 0 $I_M$cs<27 or 28.

The PUSCH TBSs are designed assuming 144 REs per PRB are available for carrying the PUSCH. The MCS table is designed assuming DFTS-OFDM waveform for PUSCH.

Rel-8 LTE PUSCH was designed to operate a synchronous HARQ protocol. For initial transmissions, the redundancy version is restricted to $rV_d$x=0.

For NR PUSCH, it was proposed that the MCS table provides modulation order, Qm, and target code rate, R, instead of the TBS index $I_{TBS}$. One such example for PUSCH with OFDM waveform is provided in Table 1 below. The target code rates are those agreed for LTE MCS table for 256QAM support.

For $0 \leq I_{MCS} \leq 27$, the UE determines the TBS based on, for example, $$TBS = 8 \times \left\lceil \frac{N_{PRB} \cdot N_{RE}^{DL,PRB} \cdot \upsilon \cdot Q_m \cdot R}{8} \right\rceil$$

where v is number of layers the codeword is mapped onto $$N_{RE}^{DL,PRB}$$

is the number of REs per slot/mini-slot available for carrying the PUSCH.

For $28 \leq I_{MCS} \leq 31$, the TBS is assumed to be determined from the DCI in the most recently received PDCCH for the same TB using $0 \leq I_{MCS} \leq 27$.

As discussed in the above, $$N_{RE}^{DL,PRB}$$

is assumed to be 144 in LTE. For NR to support various slot/mini-slot/PUSCH lengths, a more flexible framework for $$N_{RE}^{DL,PRB}$$

is to be used. One or more of the following components can be considered:

A default $$N_{RE}^{DL,PRB}$$

value may be defined in specs and can be applicable to, e.g., system information, paging and random access reply transmissions. For this purpose, $$N_{RE}^{DL,PRB} = 144$$

can be considered for 14-OS slot and $$N_{RE}^{DL,PRB} = 72$$

can be considered for 7-OS slot.

Some default $$N_{RE}^{DL,PRB}$$

values for different PUSCH transmission lengths can be specified in the specification.

The network can configure the UE to apply a specific $$N_{RE}^{DL,PRB}$$

to the PUSCH.

The network can configure a set of $$N_{RE}^{DL,PRB}$$

values (e.g., four values) to the UE. The DCI then contains an index to instruct the UE to apply one of the pre-configured $$N_{RE}^{DL,PRB}$$

value for the current PUSCH.

If code rates lower than those available in the MCS table are found to be necessary for a specific use case (e.g., URLLC), the network can configure/select a $$N_{RE}^{DL,PRB}$$

value that is substantially lower such that the allocated resources are used to carry a substantially smaller TB.

TABLE 1

Example MCS table for NR PUSCH with OFDM waveform (The target code rates are those agreed for LTE MCS table for 256QAM support).

| MCS Index $I_{MCS}$ | Modulation order $Q_m$ | Code Rate R × 1024 |
|---|---|---|
| 0 | 2 | 120 |
| 1 | 2 | 193 |
| 2 | 2 | 308 |
| 3 | 2 | 449 |
| 4 | 2 | 602 |
| 5 | 4 | 378 |
| 6 | 4 | 434 |
| 7 | 4 | 490 |
| 8 | 4 | 553 |
| 9 | 4 | 616 |
| 10 | 4 | 658 |
| 11 | 6 | 466 |
| 12 | 6 | 517 |
| 13 | 6 | 567 |
| 14 | 6 | 616 |
| 15 | 6 | 666 |
| 16 | 6 | 719 |
| 17 | 6 | 772 |
| 18 | 6 | 822 |
| 19 | 6 | 873 |
| 20 | 8 | 682.5 |
| 21 | 8 | 711 |
| 22 | 8 | 754 |
| 23 | 8 | 797 |
| 24 | 8 | 841 |
| 25 | 8 | 885 |
| 26 | 8 | 916.5 |
| 27 | 8 | 948 |
| 28 | 2 | reserved |
| 29 | 4 | |
| 30 | 6 | |
| 31 | 8 | |

RRC Configuration and Processing Delay

When the UE receives an RRC command, the UE is allowed a time window (shown in FIG. 5 as RRC Procedure Delay) during which the UE can apply the RRC command at any time during the window. Due to this delay, the radio network node (e.g. eNodeB (eNB), gNodeB (gNB)) that is communicating with the UE will be uncertain about the RRC configuration of the UE during the time window. For example, if the UE is configured to transmit PUSCH using waveform type 1 and if it receives an RRC command indicating waveform type 2, during the time window corresponding to RRC processing delay, the network will be uncertain whether the PUSCH transmissions by the UE are type 1 or type 2. Type 1 can OFDM, type 2 can be DFTS-OFDM or vice versa.

Transmission Profiles

In the last RAN2 meeting the following was concluded in RAN2:

For LCP and to know which restrictions to use the MAC needs to be aware of more information than just TTI length (e.g. numerology). An abstraction based on index or profiles can be supported. Exact parameters are FFS.

The approach RAN2 is going for is to define transmission index/profiles for the uplink. The LCPs that map to a given profile. The configuration would in the end be RRC configured. Multiple LCP could be mapped to the same profile or a single LCP can be mapped to a profile. Currently there are in total 8 LCPs defined within RAN2. From a RAN1 point of view, it would be good to consider this in designs from the start and inform RAN2 about the applicable setup can be envisioned from RAN1. From a physical layer perspective, the gNB can set the number of symbols the PUSCH is located within together with its applicable MCS, TBS, etc. In that sense, the gNB could select the applicable settings that are suitable for a given profile and hence the UL grant would only need to indicate the associated profile with the specific transmission. Together with the profile one could automatically potentially consider having a parameter setting the received target SINR (PO) at the gNB that is profile dependent.

Other than the above consideration the main aspect for RAN1 to consider is how many profiles that should be supported. Given that there is 8 LCP currently defined going beyond 8 profiles does not seem to attractive. Similarly having two few profiles as 2 would be rather restrictive. Hence going for either 4 or 8 profile would be a suitable choice. This would lead to either 2 or 3 bits in the UL grant to indicate the associated transmission profile.

CORESETs and Search Space

NR uses OFDM in the downlink. The basic NR downlink physical resource can thus be seen as a time-frequency grid as illustrated in FIG. 6 where each resource element corresponds to one OFDM subcarrier during one OFDM symbol interval. Multiple sub-carrier spacings are supported in NR. FIG. 6 illustrates the case where the sub-carrier spacing is 15 kHz.

PDCCHs (Physical Downlink Control Channels) are used in NR for downlink control information (DCI), e.g. downlink scheduling assignments and uplink scheduling grants. The PDCCHs are in general transmitted at the beginning of a slot and relate to data in the same or a later slot, but a UE can in principle be configured to monitor PDCCHs more often than once per slot, e.g. to handle mini-slot-based transmissions. Different formats (sizes) of the PDCCHs are possible to handle different DCI payload sizes and different aggregation levels (i.e. different code rate for a given payload size). A UE is configured (implicitly and/or explicitly) to blindly monitor (or search) for a number of PDCCH candidates of different aggregation levels and DCI payload sizes. Upon detecting a valid DCI message (i.e. the decoding of a candidate is successful and the DCI contains a ID the UE is told to monitor) the UE follows the DCI (e.g. receives the corresponding downlink data or transmits in the uplink). The blind decoding process comes at a cost in complexity in the UE but is required to provide flexible scheduling and handling of different DCI payload sizes.

The DCI could also be used in combination with RRC signaling to signal a quantity needed for transmission or reception. One example is signaling of resources to be used for feedback signaling in the uplink such as hybrid-ARQ acknowledgements. Indicating the complete location in the uplink may result in too large DCI overhead. Instead, a two-bit index can be transmitted as part of the DCI and used as an index into a table, selecting one out of four preconfigured (or predefined) entries. This way, the DCI overhead can be kept small while at the same time allow for a significant amount of flexibility to handle different deployment scenarios and operating conditions. The same approach could in principle be used for any control information, not only the hybrid-ARQ resources to be used in the uplink.

In NR, there are currently discussions on how to configure control resource regions where the UE can monitor for PDCCH transmissions and how a UE can be configured with multiple control resource regions. Some of these control regions may be used for sending common control messages that are intended for multiple UEs and some may be intended for UE-specific control messages. A control region could serve both common and UE-specific control messages. One difference in NR from LTE is that the carrier bandwidths may be larger and hence there are benefits seen in the control region not spanning the entire bandwidth of the carrier. Thus, it is expected that control regions will be limited in time and in frequency.

Control regions generally need to be dimensioned to ensure that multiple UEs can be signaled within the region. To do this, statistical multiplexing principles are used where the number of UEs that are assigned to a control region to search for control messages is much greater than the resource available in the control region. Therefore, the search spaces for different UEs are randomized so that statistical multiplexing can be used to minimize the blocking probability when any particular UE needs to be scheduled. Therefore, control regions are expected to be dimensioned to be able to signal PDCCHs for multiple UEs simultaneously and the number of UEs that are assigned to monitor the control region is expected to be greater than the number of UEs that can simultaneously be signaled.

In the following, a CORESET is a control resource set that is configured to the UE. A CORESET is a set of resource elements (REs) that spans a set of PRBs in frequency and OFDM symbols in time. A UE may be configured with one or more CORESETs which the UE should monitor for the potential reception of one or more PDCCHs. CORESETs for one UE or different UEs can in principle be (partly) overlapping. For simplicity, in FIGS. 8 and 9, it is assumed that the CORESETs are not partly overlapping.

Using the resources defined by a CORESET, blind decoding using one or more search spaces can be performed to detect the valid PDCCH(s), if any (see FIG. 9). A number of resources in a CORESET form a control channel element, CCE. The UE attempts to blindly decode PDCCHs using one or more of these CCEs. Typically, different search spaces use different aggregation levels, where an aggregation level is the number of CCEs used by a PDCCH candidate. For example, the search space on aggregation level one monitor for PDCCH candidates consisting of a single CCE, the search space on aggregation level two monitor for PDCCH candidates consisting of pairs of CCEs, etc. Which CCEs (or set of CCEs) that constitute a PDCCH candidate in each search space is given by some rule.

In some cases, to receive common control messages, multiple UEs may monitor (or attempt to decode) control signaling in the same search space. Such a search space can be called a common search space where parameters associated with the search space (e.g. CCE locations, monitored aggregation levels, randomization/hashing function related parameters) are not linked to UE-specific parameters such as UEID or an RNTI assigned to the UE. To receive UE-specific control messages, UE may monitor (or attempt to decode) control signaling in a UE-specific search space. For a UE-specific search space at least one or more parameters associated with the search space (e.g. CCE locations, monitored aggregation levels, randomization/hashing function related parameters) are linked to UE-specific parameters such as UEID or an RNTI assigned to the UE.

SUMMARY

NR supports two waveforms at least in the uplink. One is OFDM and the other one is DFTS-OFDM. If waveform switching is done, for instance, via RRC signaling, there will be a period of uncertainty in conjunction with RRC signaling where the waveform the UE will use in the uplink is not known to the network. In LTE, this uncertainty period from the standard is 15 ms and in addition there may be some implementation based uncertainty from the network side.

According to some embodiments, the UE is made aware of which waveform to use in the uplink based at least in part on a characteristic of a downlink transmission. For example, the UE may use a default waveform for uplink transmissions in response to uplink grants received in a particular search space (e.g., a common search space).

According to one aspect, some embodiments include a method to be performed by a user equipment, UE. The method generally comprises receiving a downlink transmission from a radio network node, the downlink transmission having at least one characteristic, selecting one waveform from two or more waveforms for an upcoming uplink transmission to the radio network node, the waveform being selected based at least in part on the at least one characteristic of the downlink transmission, and transmitting the uplink transmission to the radio network node using the selected waveform.

In some embodiments, the downlink transmission may comprise a downlink control message. In some embodiments, the downlink control message may comprise an uplink grant.

In some embodiments, the at least one characteristic may be a search space in which the downlink control message is transmitted. The search space may be one of a common search space and a UE-specific search space.

In some embodiments, the at least one characteristic may be a control resources set in which the downlink control message is transmitted. The control resources set may be one of a first control resources set and a second control resources set.

In some embodiments, the at least one characteristic may be a modulation and coding scheme, MCS, index of the downlink control message.

In some embodiments, the at least one characteristic may be a radio network temporary identifier, RNTI, used to scramble the downlink control message.

In some embodiments, the at least one characteristic may be a format the downlink control message.

In some embodiments, the method may comprise, or further comprise, selecting one resource allocation from two or more resource allocations for the uplink transmission based at least in part on the at least one characteristic, and transmitting the uplink transmission to the radio network node using the selected resource allocation.

In some embodiments, the method may comprise, or further comprise, obtaining an identification of the two or more waveforms. In such embodiments, the method may comprise, or further comprise, receiving an identification of at least one of the two or more waveforms via radio resource control, RRC, signaling received from the radio network node.

According to another aspect, some embodiments include a UE configured, or operable, to perform one or more UE functionalities (e.g. steps, actions, etc.) as described herein.

In some embodiments, the UE may comprise a transceiver configured to communicate with one or more radio network nodes and/or with one or more other UEs, and processing circuitry operatively connected to the transceiver, the processing circuitry being configured to perform one or more UE functionalities as described herein. In some embodiments, the processing circuitry may comprise at least one processor and at least one memory storing instructions which, upon being executed by the processor, configure the processor to perform one or more UE functionalities as described herein.

In some embodiments, the UE may comprise one or more functional modules configured to perform one or more UE functionalities as described herein.

According to another aspect, some embodiments include a non-transitory computer-readable medium storing a computer program product comprising instructions which, upon being executed by processing circuitry (e.g., a processor) of the UE, configure the processing circuitry to perform one or more UE functionalities as described herein.

According to another aspect, some embodiments include a method to be performed by a radio network node. The method generally comprises transmitting a downlink transmission to a user equipment, the downlink transmission having at least one characteristic, and receiving an uplink transmission from the user equipment, the uplink transmission using a waveform selected from two or more waveforms based at least in part on the at least one characteristic of the downlink transmission.

In some embodiments, the downlink transmission may comprise a downlink control message. In some embodiments, the downlink control message may comprise an uplink grant.

In some embodiments, the at least one characteristic may be a search space in which the downlink control message is transmitted. The search space may be one of a common search space and a UE-specific search space.

In some embodiments, the at least one characteristic may be a control resources set in which the downlink control message is transmitted. The control resources set may be one of a first control resources set and a second control resources set.

In some embodiments, the at least one characteristic may be a modulation and coding scheme, MCS, index of the downlink control message.

In some embodiments, the at least one characteristic may be a radio network temporary identifier, RNTI, used to scramble the downlink control message.

In some embodiments, the at least one characteristic may be a format of the downlink control message.

In some embodiments, the method may comprise, or further comprise, determining the at least one characteristic of the downlink transmission based at least in part on the one of the two or more waveforms desired for the upcoming uplink transmission.

In some embodiments, the method may comprise, or further comprise, transmitting an identification of at least one of the two or more waveforms to the UE. In such embodiments, transmitting an identification of at least one of the two or more waveforms to the UE may be performed via RRC signaling.

According to another aspect, some embodiments include a radio network node configured, or operable, to perform one or more radio network node functionalities (e.g. steps, actions, etc.) as described herein.

In some embodiments, the radio network node may comprise a transceiver configured to communicate with one or more UEs, and a communication interface configured to communicate with one or more other radio network nodes and/or with one or more network nodes (including core network nodes), and processing circuitry operatively connected to the communication interface, the processing circuitry being configured to perform one or more radio network node functionalities as described herein. In some embodiments, the processing circuitry may comprise at least one processor and at least one memory storing instructions which, upon being executed by the processor, configure the processor to perform one or more radio network node functionalities as described herein.

In some embodiments, the radio network node may comprise one or more functional modules configured to perform one or more radio network node functionalities as described herein.

According to another aspect, some embodiments include a non-transitory computer-readable medium storing a computer program product comprising instructions which, upon being executed by processing circuitry (e.g., a processor) of the radio network node, configure the processing circuitry to perform one or more radio network node functionalities as described herein.

Some embodiments may remove uncertainty about the waveform type used by the UE during RRC reconfiguration of waveform type.

Other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which:

FIG. 2 is a graph of guard interval; a) cyclic prefix, b) true guard interval.

Figure 3:
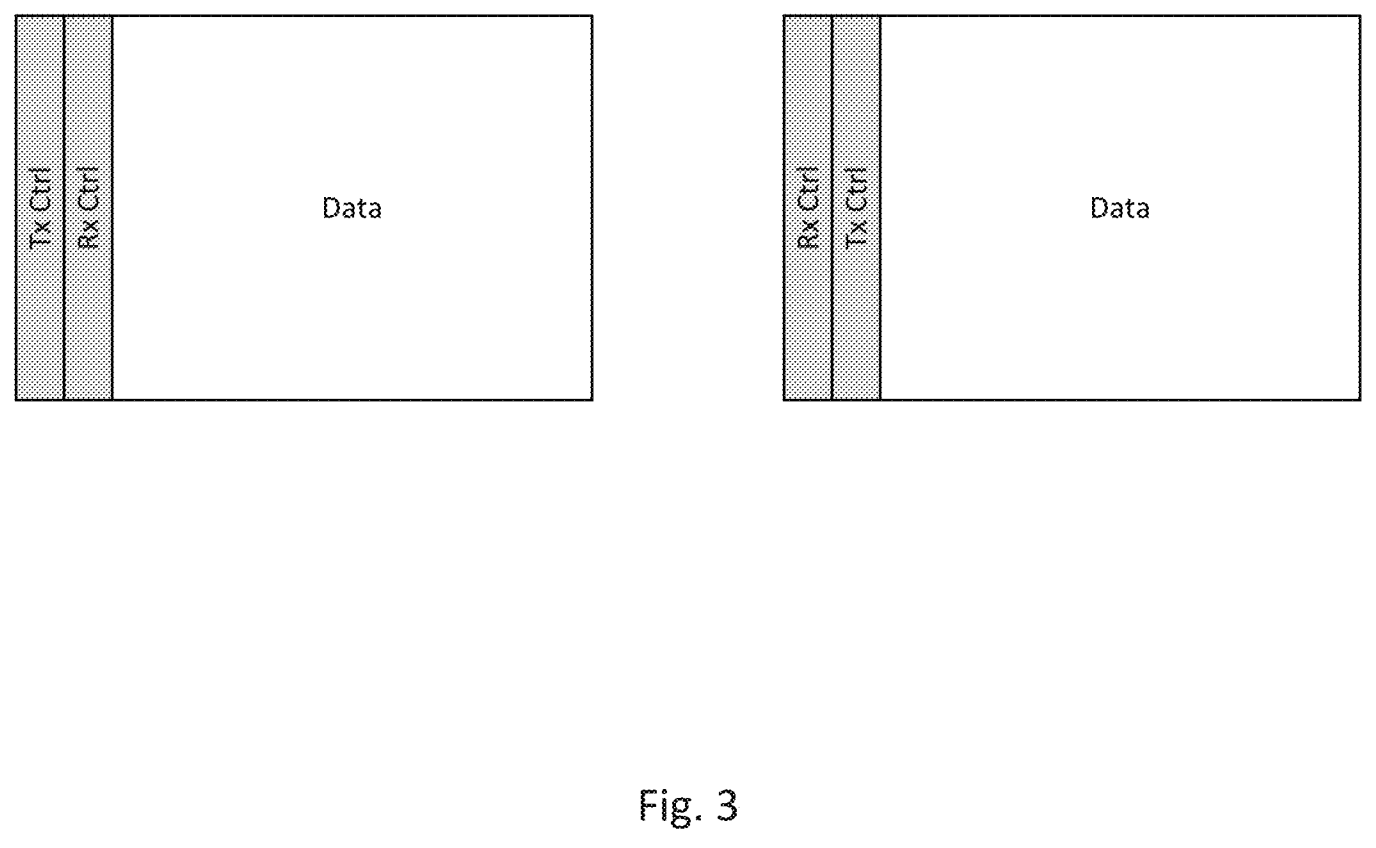

FIG. 3 is a schematic diagram of possible frame structure and directional assignments.

Figure 4:
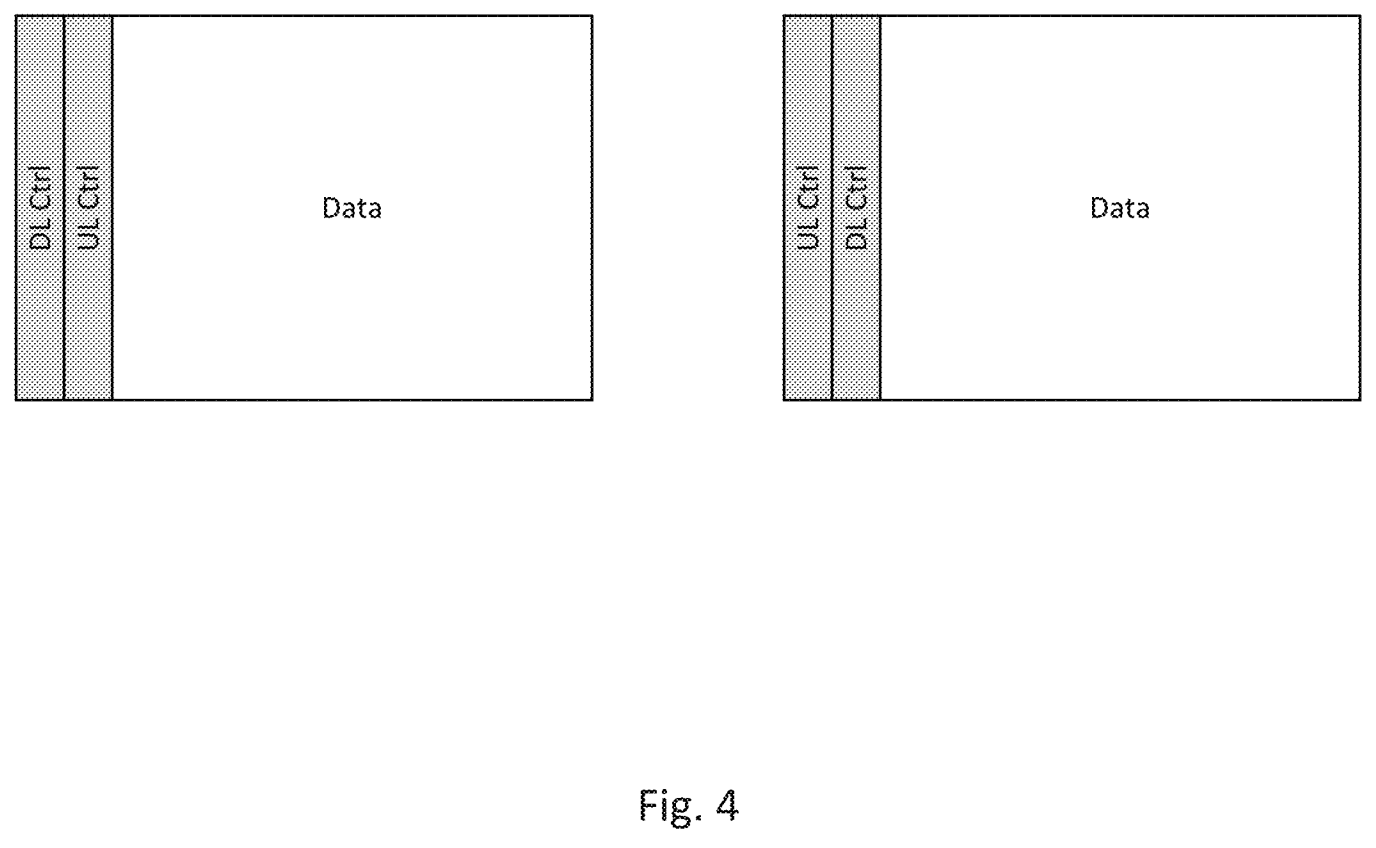

FIG. 4 is another schematic diagram of possible frame structure and directional assignments.

FIG. 13 is a flow chart of operations of a radio network node in accordance with some embodiments.

DETAILED DESCRIPTION

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment.

Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Figure 1:
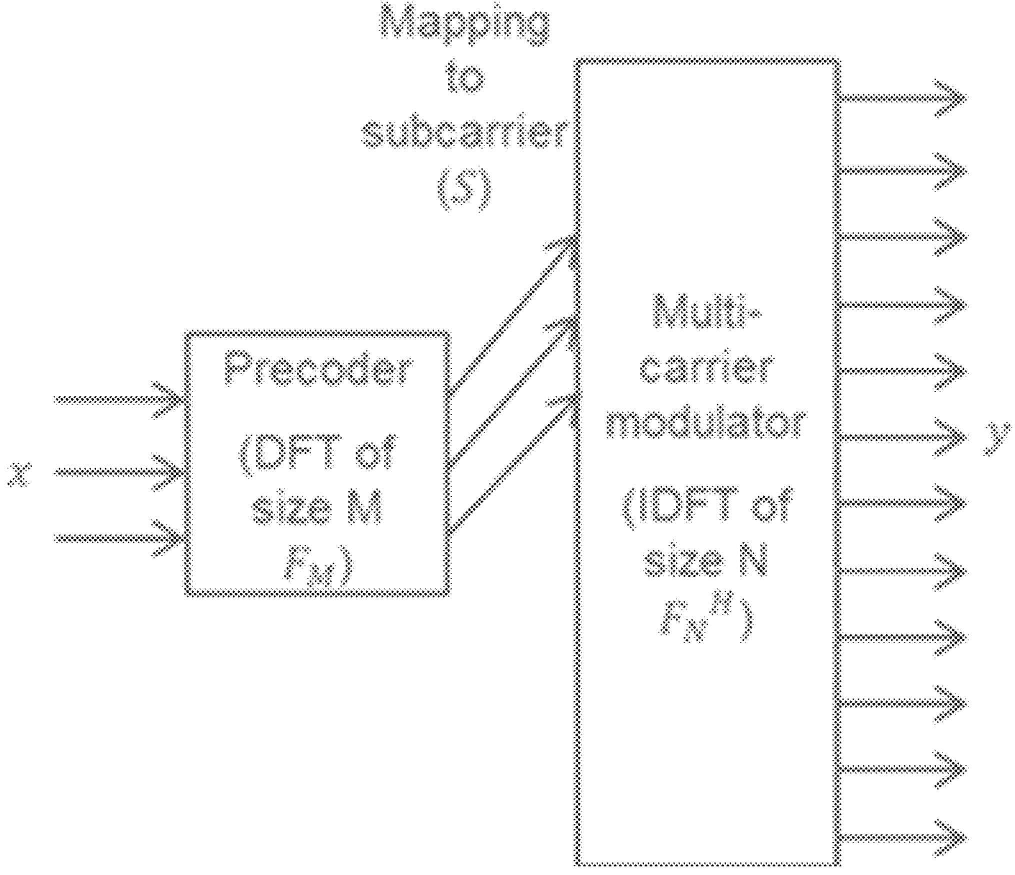
FIG. 1 is a schematic diagram of precoded multi-carrier signaling.
Figure 5:
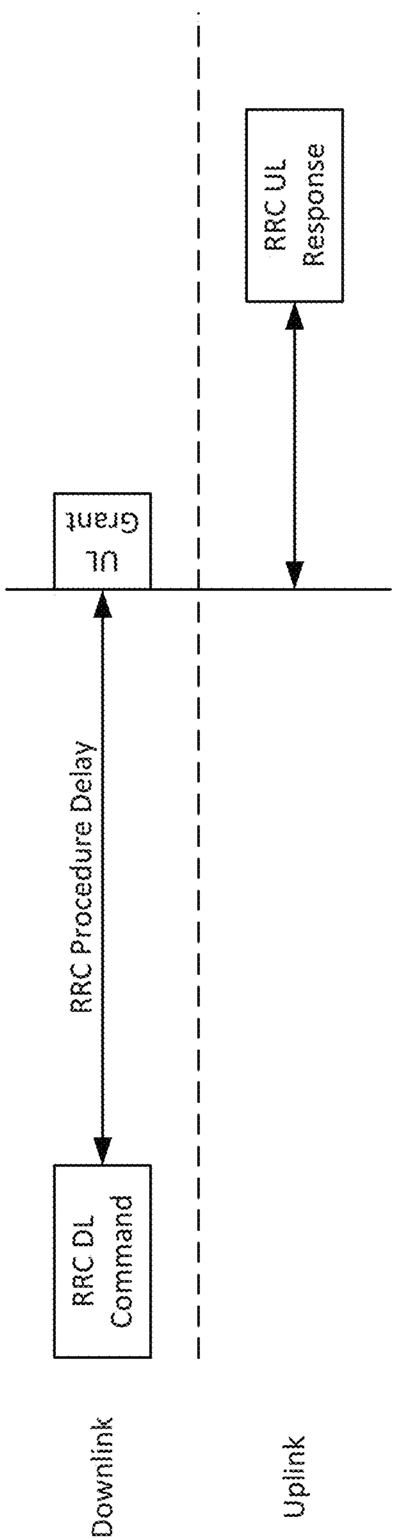
FIG. 5 is a schematic diagram of RRC procedure delay.
Figure 6:
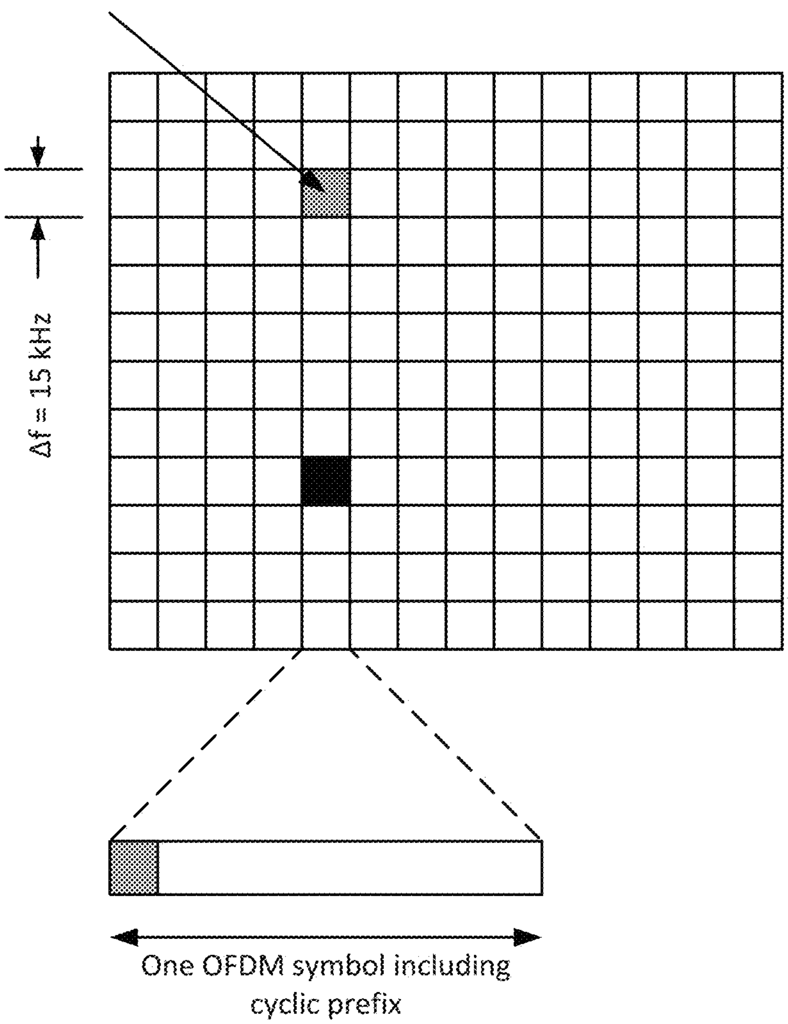
FIG. 6 is a schematic diagram of NR downlink physical resources with 15 kHz sub-carrier spacing.
Figure 7:
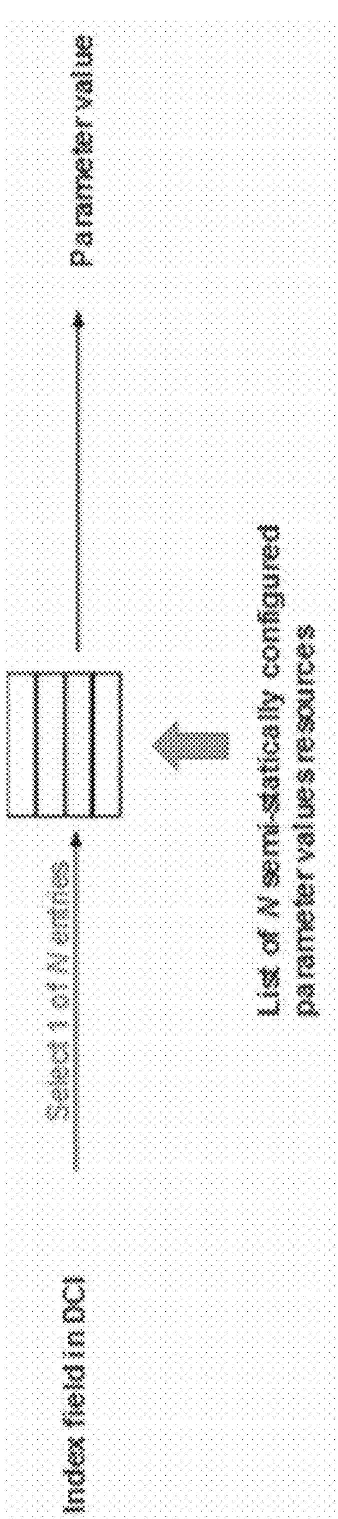
FIG. 7 is a schematic diagram of combination of dynamic and semi-static signaling of a parameter value.
Figure 8:
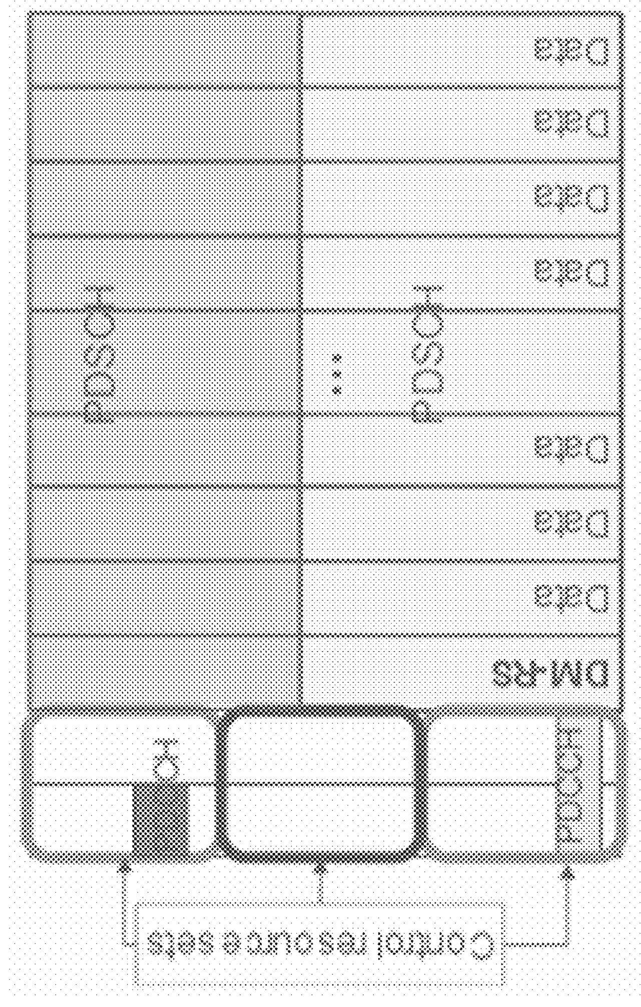
FIG. 8 is a schematic diagram of control resource sets (CORESETs).
Figure 9:
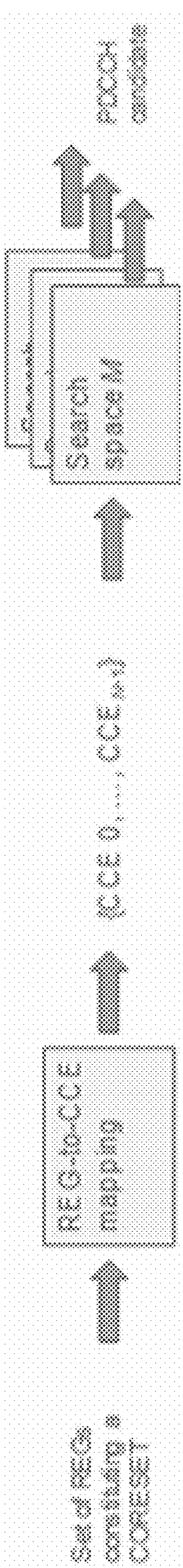
FIG. 9 is a schematic diagram of the relation between control resource sets (CORESETs) and search spaces.
Figure 10:
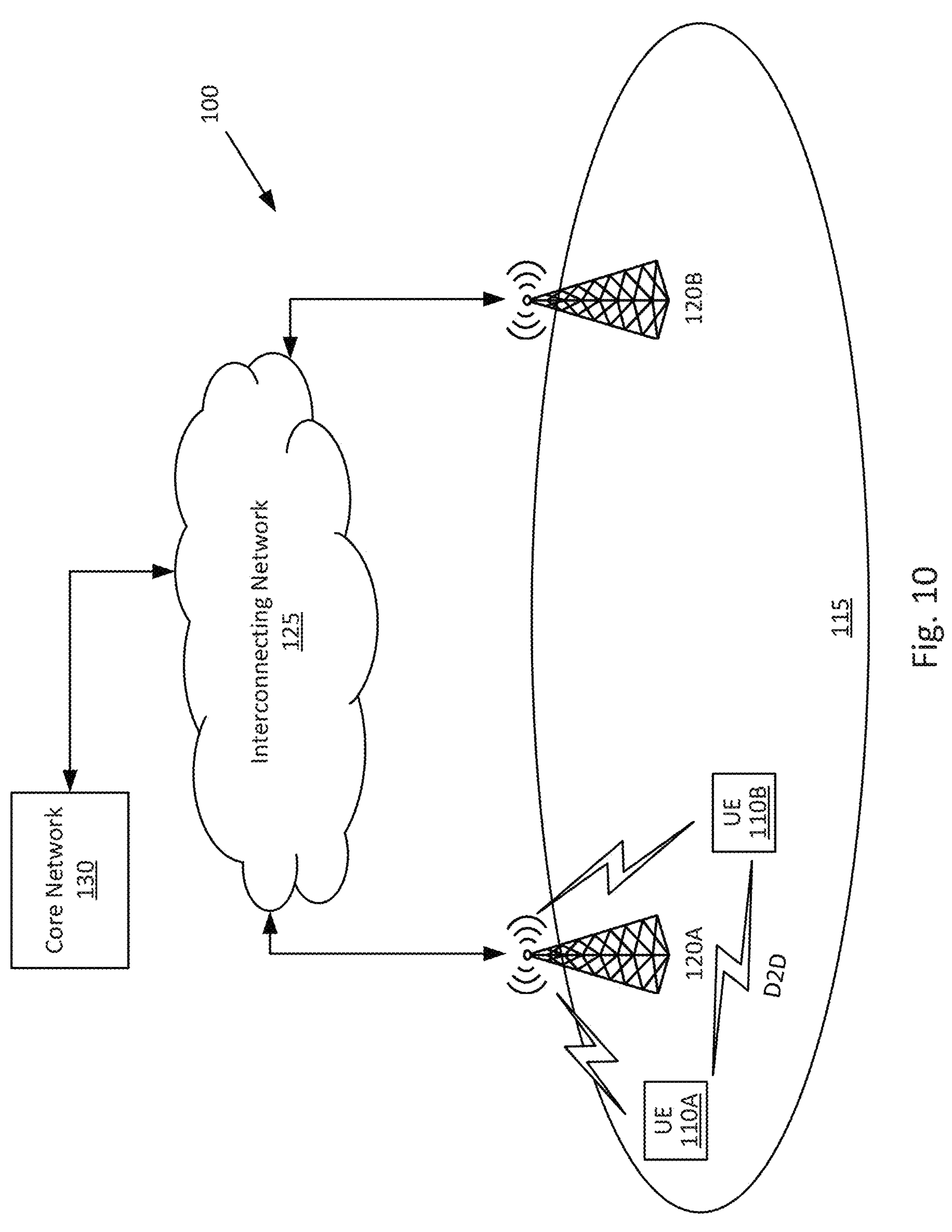
FIG. 10 is a schematic diagram of an example communication network in accordance with some embodiments.

FIG. 10 illustrates an example of a wireless network 100 that may be used for wireless communications. Wireless network 100 includes UEs 110A-110B (collectively referred to as UE or UEs 110) and a plurality of radio network nodes 120A-120B (e.g., NBs, RNCs, eNBs, gNB, etc.) (collectively referred to as radio network node or radio network nodes 120) directly or indirectly connected to a core network 135 which may comprise various core network nodes 130. The network 100 may use any suitable radio access network (RAN) deployment scenarios, including UMTS Terrestrial Radio Access Network, UTRAN, and Evolved UMTS Terrestrial Radio Access Network, EUTRAN, and New Radio (RN) Radio Access Network. UEs 110 within coverage areas 115 may each be capable of communicating directly with radio network nodes 120 over a wireless interface. In certain embodiments, UEs may also be capable of communicating with each other via device-to-device (D2D) communication.

As an example, UE 110A may communicate with radio network node 120A over a wireless interface. That is, UE 110A may transmit wireless signals to and/or receive wireless signals from radio network node 120A. The wireless signals may contain voice traffic, data traffic, control signals, and/or any other suitable information. In some embodiments, an area of wireless signal coverage associated with a radio network node 120 may be referred to as a cell.

The description is in the context of selecting between DFTS-OFDM and OFDM based waveform in uplink (UL) for NR. It can however be understood that the same principle can be applied for PDSCH for downlink (DL). It could further be applied for more than selecting between these two waveforms. The selection could be increased to include three, four or more waveforms as well. It could further be between OFDM and some other type of waveform as well.

In some embodiments, a default waveform type (e.g. OFDM or DFTS-OFDM) is indicated to the UE 110 as part of system information or specified in the standard. The UE 110 is also configured via RRC with a waveform type (RRC configured waveform type). When the UE 110 receives an UL grant, the UE would use either the default waveform type or the RRC configured waveform type based on a characteristic of the uplink grant.

The characteristic of the UL grant can be a search space in which a control channel (e.g. PDCCH) associated with the UL grant is received. For example, if the UE 110 receives the UL grant in a common search space, UE may be configured to use the default waveform type for the corresponding UL transmission. If the UE 110 receives the UL grant in a UE-specific search space, it may be configured to use the RRC configured waveform type for the corresponding UL transmission.

Using the search space is only one example of a characteristic of the downlink transmission that can be used by the UE 110 to select a waveform for the uplink.

In some other embodiments, the characteristic of the UL grant can be a CORESET in which a control channel (e.g. PDCCH) associated with the UL grant is received. For example, if the UE 110 receives the UL grant in a first CORESET (e.g. a default CORESET), the UE 110 may be configured to use the default waveform type for the corresponding UL transmission. If the UE 110 receives the UL grant in a second CORESET, it may be configured to use the RRC configured waveform type for the corresponding UL transmission.

In some other embodiments, the characteristic of the UL grant can be a MCS index signaled by the UL grant. For example, if the UE 110 receives the UL grant with an MCS index belonging to a first set of values (e.g., MCS index <5), UE 110 may be configured to use the default waveform type for the corresponding UL transmission. If the UE 110 receives the UL grant with an MCS index not belonging to the first set of values, it may be configured to use the RRC configured waveform type for the corresponding UL transmission.

RRC signaling indicating the RRC configured waveform type can be as follows:

Type1: OFDM; Type2: DFTS-OFDM (or vice versa).

Type1: OFDM or DFTS-OFDM; Type 2: determine waveform type using an MCS index signaled in UL grant and an associated MCS/TBS table.

Instead of being signaled via system information, the default waveform type can be a pre-specified as OFDM or DFTS-OFDM. In other words, the UE 110 could be preloaded or preconfigured with a specific default waveform.

In some embodiments, the waveform selection can also be done as described above together with at least one or more parameter (see the following table as an example). Here, in addition to the UL grant characteristic, the number of layers of the granted UL transmission is also considered. The UL grant characteristic is only important for one layer, all transmissions using more than one layer use waveform 2.

| MIMO layers | UL grant characteristic | Waveform |
|---|---|---|
| 1 | A (e.g. common search space) | Waveform 1 (e.g. DFTS-OFDM) |
| 1 | B (e.g. UE specific search space) | Waveform 2 (e.g. OFDM) |
| >1 | — | Waveform 2 (e.g. OFDM) |

During the RRC reconfiguration, the radio network node 120 can send an UL grant to the UE 110 such that the UE 110 uses "default waveform type" to overcome the uncertainty during the time window corresponding to RRC processing delay.

In some embodiments, the waveform that is used could be based on which DCI format the UE 110 is granted with. For example, DCI format X may always indicate that DFTS-OFDM is used and a DCI format Y may always indicate that CP-OFDM is used. This can further be combined with the above examples, so that for example a DCI format X in a given search space or CORESET gives a certain waveform but in another search space or CORESET it gives another waveform. Instead of the DCI format also the RNTI that is used to scramble the UL grant can be used as waveform selector.

In some embodiments, the waveform selection can be based on which transmission profile or index that used. So that for given transmission profile/index a given waveform is assumed, and for another transmission profile another waveform is assumed.

A specific aspect is the configuration/granting for grant free/semi-persistent scheduling for which the waveform maybe directly configured by RRC when setting on the resource. Another option is that it is given by one of the above options or indicated in an activation DCI message.

In some embodiments, when the UE 110 receives an UL grant and the UE 110 determines that the UL grant is associated with either the default waveform type or the RRC configured waveform type based on the characteristic of the uplink grant, the UE may also determine a resource allocation type (RA type) for PUSCH transmission resources (e.g. frequency domain resource blocks—RBs) based on the characteristic. For example, for UL grants monitored in common search space, the UE 110 can assume an RA type that allocates contiguous RBs (e.g. RAtype0) irrespective of whether the UL grant indicates OFDM or DFTS-OFDM waveform type; for UL grants monitored in UE-specific search space, the UE 110 can assume an RA type that allocates both contiguous and non-contiguous RBs (e.g. RAtype1) if the RRC configured waveform type is set to OFDM and assume an RAtype that allocates only contiguous RBs (RAtype0) if the RRC configured waveform type is set to DFTS-OFDM. Typically, RAtype1 would need more signaling bits than RAtype0, and therefore DCI format sizes of UL grants with RAtype0 and RAtype1 can be different. However, since the UE 110 can assume only a single RAtype for UL grants monitored in common search space, it does not have to monitor for multiple DCI format sizes thereby reducing UE blind decoding complexity. For UL grants monitored in UE-specific search space, the UE 110 can monitor for a DCI Format size according to RAtype0 if RRC configured waveform type is DFTS-OFDM, and monitor for a DCI Format size according to RAtype1 if RRC configured waveform type is OFDM.

Figure 11:
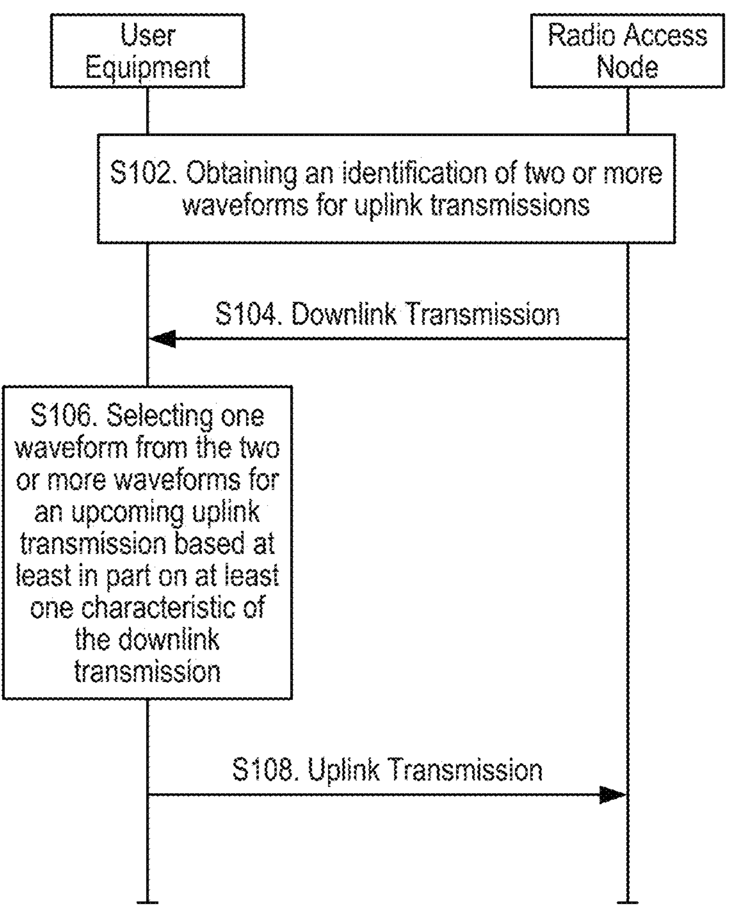
FIG. 11 is a signaling diagram in accordance with some embodiments.

Referring now to FIG. 11, a high-level signaling diagram according to some embodiments is illustrated. As shown, the UE 110 may first obtain an identification of the two or more waveforms which the UE 110 can use for uplink transmission (action S102). How the UE 110 obtains the identification of the waveforms can vary. For instance, in some embodiments, the UE 110 can be preloaded with the identification of a first, or default, waveform and obtain the identification of a second waveform via RRC signaling. In other embodiments, the UE 110 can obtain the identification of a first waveform via system information (SI) signaling which is usually broadcasted by the radio network node 120. The UE 110 can obtain the identification of a second waveform via RRC signaling. Regardless of how the UE 110 obtains the identification of the two or more waveforms, the UE 110 subsequently receives a downlink transmission from the radio network node 120 (action S104). The downlink transmission received by the UE 110 has at least one characteristic. Broadly, the characteristic is a feature of the downlink transmission itself or of the message(s) it carries that can be detected by the UE 110. As indicated above, the at least one characteristic of the downlink transmission may be a particular search space in which a downlink control message is located, the set of control resources in which a downlink control message is located, the MCS index of the downlink control message, the format of the downlink control message, the RNTI with which the downlink control message is scrambled, etc.

Based at least in part on the at least one characteristic of the downlink transmission, the UE 110 selects one waveform among the two or more waveforms for an upcoming uplink transmission (action S106). For instance, using the search space in which the downlink control message is transmitted as an example characteristic of the downlink transmission, the UE 110 can be configured to select a first, or default, waveform when the downlink control message is transmitted in a common search space, and select a second (e.g., RRC configured) waveform when the downlink control message is transmitted in a UE-specific search space.

After having selected the waveform, the UE 110 transmitted an uplink transmission to the radio network node 120 using the selected waveform (action S108). Knowing how the UE 110 will select the waveform for the uplink transmission based on the at least one characteristic of the downlink transmission, the radio network node 120 will know what waveform to expect for the uplink transmission.

Figure 12:
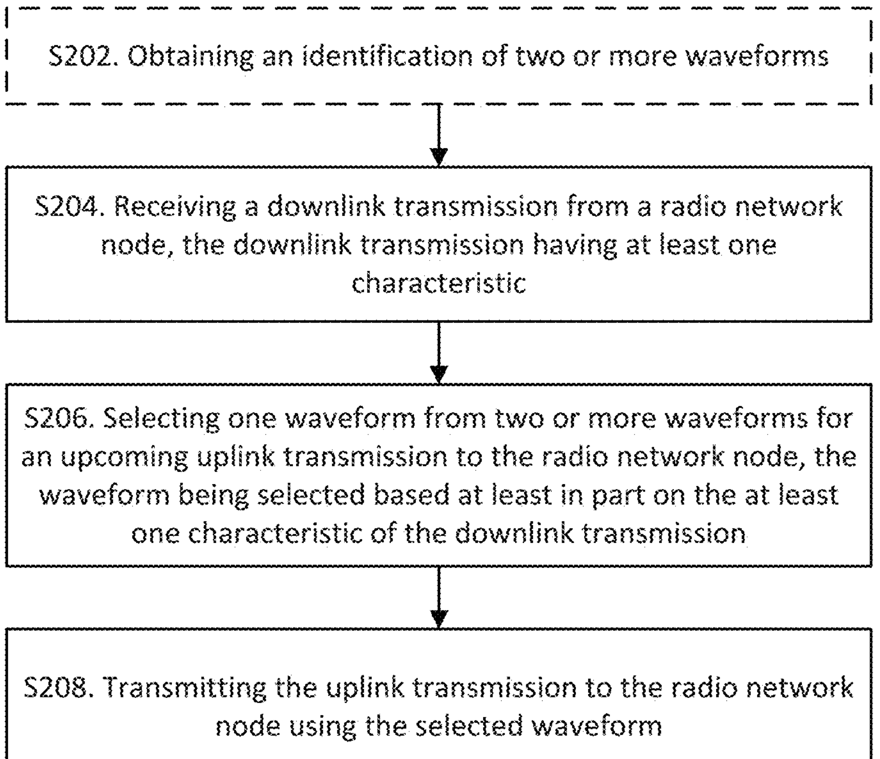
FIG. 12 is a flow chart of operations of a user equipment in accordance with some embodiments.

FIG. 12 is a flow chart that illustrates operations of the UE 110 according to some embodiments. As shown, the UE 110 may first obtain the identification of two or more waveforms (action S202). These two or more waveforms may be used by the UE 110 when communicating with the radio network node 120. How the UE 110 obtains the identifications of the two or more waveforms may vary and the UE 110 may obtain the identification of the two or more waveforms from different sources. For instance, the UE 110 may obtain the identification of a first of the two of more waveforms by retrieving it from memory, that is the UE 110 is preloaded or preconfigured with the identification of a first of the two of more waveforms, and may obtain the identification of a second of the two of more waveforms via a message (e.g., a RRC message) received from the radio network node 120.

The UE 110 then receives a downlink transmission from a radio network node, e.g., radio network node 120, the downlink transmission having at least one characteristic (action S204). The at least one characteristic of the downlink transmission may be a particular search space in which a downlink control message is located, the set of control resources in which a downlink control message is located, the MCS index of the downlink control message, the format of the downlink control message, the RNTI with which the downlink control message is scrambled, etc.

The UE 110 then selects one waveform from two or more waveforms for an upcoming uplink transmission to the radio network node 120, the waveform being selected based at least in part on the at least one characteristic of the downlink transmission (action S206).

Then, the UE 110 transmits an uplink transmission to the radio network node 120 using the selected waveform (action S208).

Turning now to FIG. 13, a flow chart that illustrates operations of the radio network node 120 according to some embodiments is illustrated. As shown, the radio network node 120 may first transmit an identification of one, some, or all of the two or more waveforms to the UE 110 (action S302). In some embodiments, this step may be optional if the UE 110, for instance, is already preloaded or preconfigured with the identification of the two or more waveforms.

The radio network node 120 may then determine at least one characteristic of a downlink transmission based at least in part on the one of the two or more waveforms desired for the upcoming uplink transmission (action S304). The radio network node 120 then transmits the downlink transmission to the UE 110 (action S304). The downlink transmission has the at least one characteristic which will be used by the UE 110 to subsequently select one of the two or more waveforms.

Thereafter, the radio network node 120 receives an uplink transmission from the UE 110, the uplink transmission using the waveform selected from the two or more waveforms based at least in part on the at least one characteristic of the downlink transmission.

Embodiments of a UE 110 will now be described with respect to FIGS. 14 and 15. Even though the expression User Equipment is used throughout the description, it is to be understood that the expression is used generically. In that sense, different communication standards often use different terminology when describing user equipment. For instance, in addition to User Equipment, 3GPP also uses mobile terminal (MT). For its part, 3GPP2 uses the term access terminal (AT) and IEEE 802.11 (also known as WiFi™) uses the term station (STA).

Figure 14:
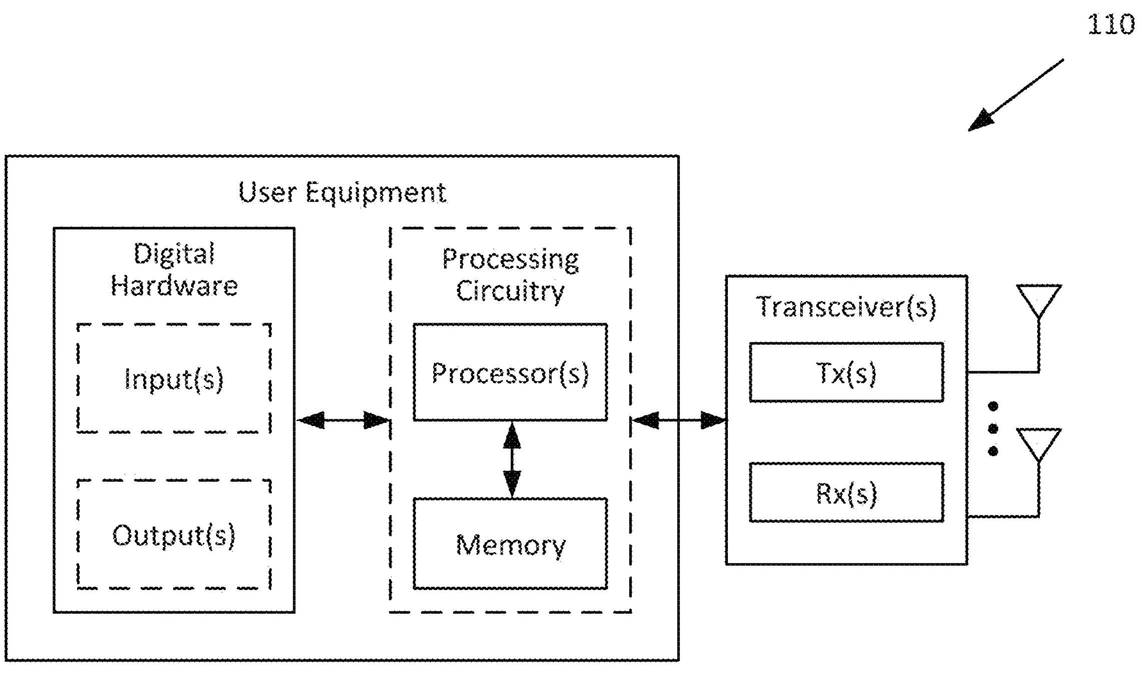
FIG. 14 is a block diagram of a user equipment in accordance with some embodiments.
Figure 15:
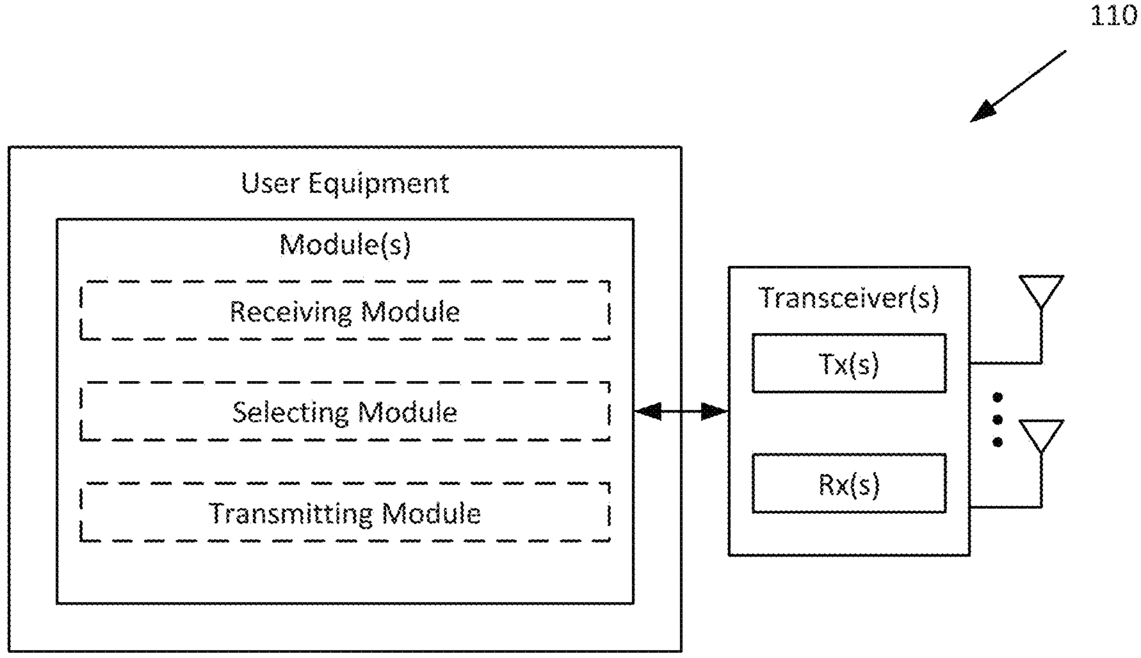
FIG. 15 is another block diagram of a user equipment in accordance with some embodiments.

FIG. 14 is a block diagram of an exemplary UE 110 in accordance with some embodiments. UE 110 includes one or more of a transceiver, processor, and memory. In some embodiments, the transceiver facilitates transmitting wireless signals to and receiving wireless signals from radio network node 120 (e.g., via transmitter(s) (Tx), receiver(s) (Rx) and antenna(s)). The processor executes instructions to provide some or all of the functionalities described above as being provided or performed by UE 110, and the memory stores the instructions executed by the processor. In some embodiments, the processor and the memory form processing circuitry.

The processor may include any suitable combination of hardware to execute instructions and manipulate data to perform some or all of the described functions of UE 110, such as the functions of UE 110 described above. In some embodiments, the processor may include, for example, one or more computers, one or more central processing units (CPUs), one or more microprocessors, one or more application specific integrated circuits (ASICs), one or more field programmable gate arrays (FPGAs) and/or other logic.

The memory is generally operable to store instructions, such as a computer program, software, an application including one or more of logic, rules, algorithms, code, tables, etc. and/or other instructions capable of being executed by a processor. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor of UE 110.

Other embodiments of UE 110 may include additional components beyond those shown in FIG. 14 that may be responsible for providing certain aspects of the UE's functionalities, including any of the functionalities described above and/or any additional functionalities (including any functionality necessary to support the solution described above). As just one example, UE 110 may include input devices and circuits, output devices, and one or more synchronization units or circuits, which may be part of the processor. Input devices include mechanisms for entry of data into UE 110.

For example, input devices may include input mechanisms, such as a microphone, input elements, a display, etc. Output devices may include mechanisms for outputting data in audio, video and/or hard copy format. For example, output devices may include a speaker, a display, etc.

In some embodiments, the UE 110 may comprise a series of functional modules configured to implement the functionalities of the UE 110 described above. Referring to FIG. 15, in some embodiments, the UE 110 may comprise a receiving module configured to receive a downlink transmission from a radio network node, the downlink transmission having at least one characteristic, a selecting module configured to select one waveform from two or more waveforms for an upcoming uplink transmission to the radio network node, the waveform being selected based at least in part on the at least one characteristic of the downlink transmission, and a transmitting module configured to transmit the uplink transmission to the radio network node using the selected waveform.

It will be appreciated that the various modules may be implemented as combination of hardware and/or software, for instance, the processor, memory and transceiver(s) of UE 110 shown in FIG. 14. Some embodiments may also include additional modules to support additional and/or optional functionalities.

Figure 16:
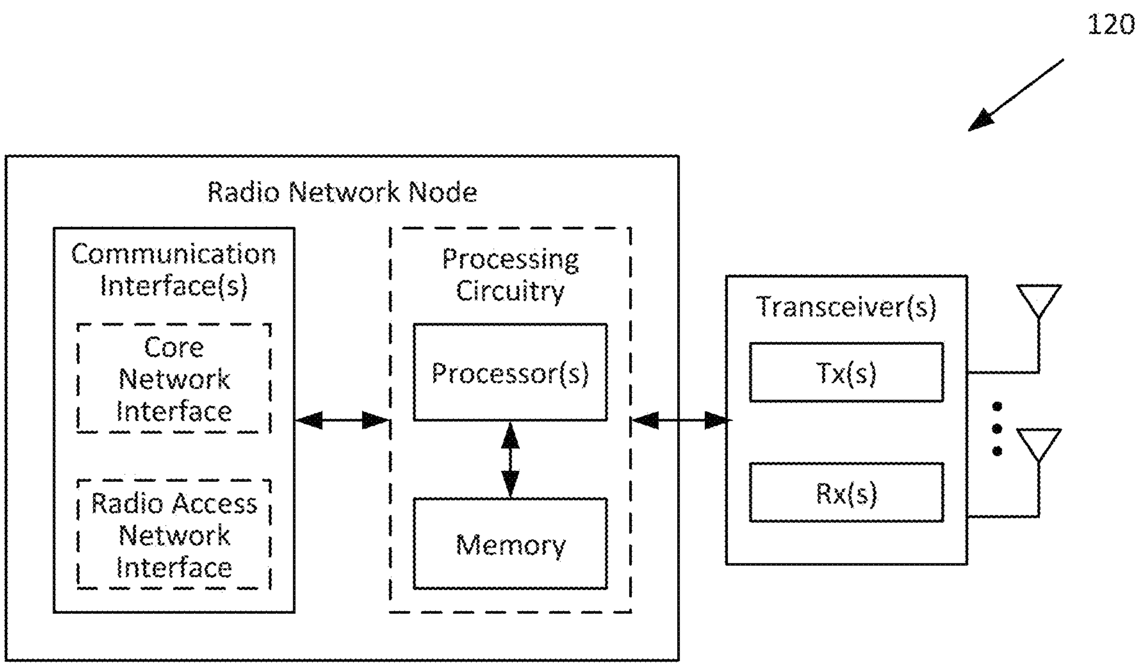
FIG. 16 is a block diagram of a radio network node in accordance with some embodiments.
Figure 17:
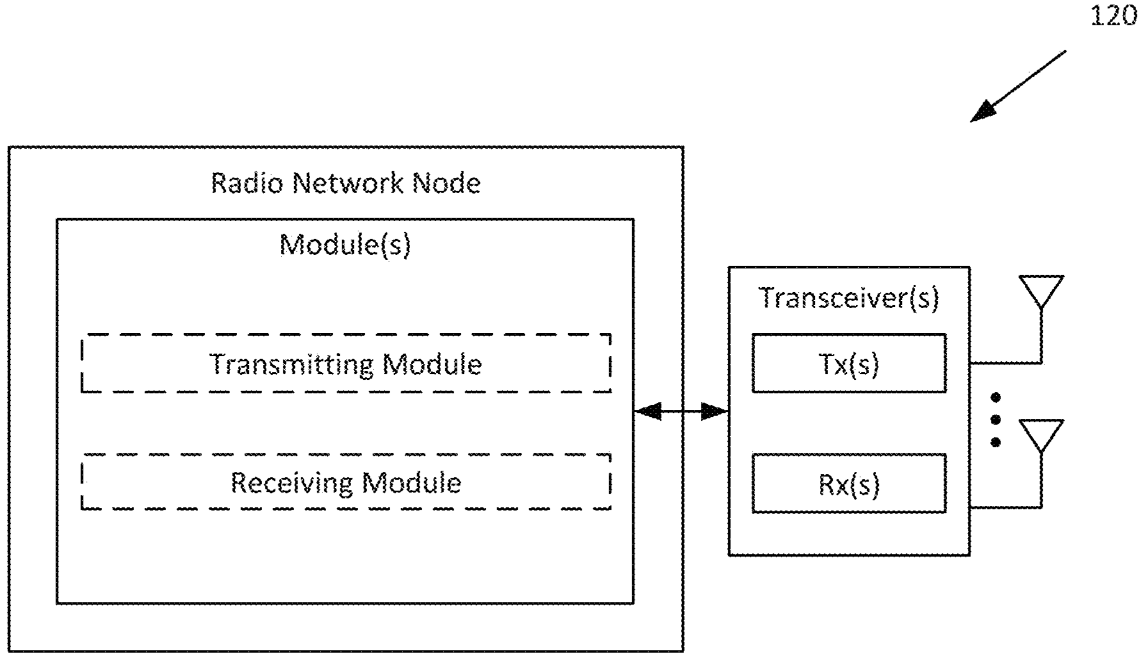
FIG. 17 is another block diagram of a radio network node in accordance with some embodiments.

Embodiments of a radio network node 120 will now be described with respect to FIGS. 16 and 17. FIG. 16 is a block diagram of an exemplary radio network node 120 in accordance with some embodiments. Radio network node 120 may include one or more of a transceiver, processor, memory, and communication interface. In some embodiments, the transceiver facilitates transmitting wireless signals to and receiving wireless signals from UE 110 (e.g., via transmitter(s) (Tx), receiver(s) (Rx), and antenna(s)). The processor executes instructions to provide some or all of the functionalities described above as being provided or performed by radio network node 120, the memory stores the instructions executed by the processor. In some embodiments, the processor and the memory form processing circuitry. The communication interface may comprise a core network interface and a radio network interface such as to allow the radio network node 120 to communicate signals to backend network components, such as a gateway, switch, router, Internet, Public Switched Telephone Network (PSTN), core network nodes or radio network controllers, etc.

The processor may include any suitable combination of hardware to execute instructions and manipulate data to perform some or all of the described functions of radio network node 120, such as those described above. In some embodiments, the processor may include, for example, one or more computers, one or more central processing units (CPUs), one or more microprocessors, one or more application specific integrated circuits (ASICs), one or more field programmable gate arrays (FPGAs) and/or other logic.

The memory is generally operable to store instructions, such as a computer program, software, an application including one or more of logic, rules, algorithms, code, tables, etc. and/or other instructions capable of being executed by a processor. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the communication interface is communicatively coupled to the processor and may refer to any suitable device operable to receive input for radio network node 120, send output from radio network node 120, perform suitable processing of the input or output or both, communicate to other devices, or any combination of the preceding. The communication interface may include appropriate hardware (e.g., port, modem, network interface card, etc.) and software, including protocol conversion and data processing capabilities, to communicate through a network.

Other embodiments of radio network node 120 may include additional components beyond those shown in FIG. 16 that may be responsible for providing certain aspects of the radio network node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

In some embodiments, the radio network node 120 may comprise a series of modules configured to implement the functionalities of the radio network node 120 described above. Referring to FIG. 17, in some embodiments, the radio network node 120 may comprise a transmitting module configured to transmit a downlink transmission to the user equipment, the downlink transmission having at least one characteristic, and a receiving module configured to receive an uplink transmission from the user equipment, the uplink transmission using a waveform selected from two or more waveforms based at least in part on the at least one characteristic of the downlink transmission.

It will be appreciated that the various modules may be implemented as combination of hardware and/or software, for instance, the processor, memory and transceiver(s) of radio network node 120 shown in FIG. 16. Some embodiments may also include additional modules to support additional and/or optional functionalities.

Some embodiments may be represented as a non-transitory software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

ABBREVIATIONS

The present description may comprise one or more of the following abbreviations:

CDM Code Division Multiplex
CQI Channel Quality Information
CRC Cyclic Redundancy Check
DCI Downlink Control Information
DFT Discrete Fourier Transform
DM-RS Demodulation Reference Signal
FBMC Filter Bank Multicarrier
FDM Frequency Division Multiplex
HARQ Hybrid Automatic Repeat Request
OFDM Orthogonal Frequency Division Multiplex
PAPR Peak to Average Power Ratio
PDCCH Physical Downlink Control Channel
PUCCH Physical Uplink Control Channel
PUSCH Physical Uplink Shared Channel
PRB Physical Resource Block
RRC Radio Resource Control
UCI Uplink Control Information

The invention claimed is:

1. A method in a user equipment, UE, the method comprising:

receiving a downlink control message from a radio network, the downlink control message having a format and having been scrambled with a radio network temporary identifier, RNTI;

selecting a waveform type from two or more waveform types including an orthogonal frequency divisional multiplexing, OFDM, and a Fourier transform spread-OFDM, DFTS-OFDM, for an upcoming uplink transmission to the radio network node, the waveform type being selected based on a combination of the format of the downlink control message, the RNTI used to scramble the downlink control message, and a radio resource control, RRC, configuration of the UE; and transmitting the uplink transmission to the radio network node using the selected waveform type.

2. The method of claim 1, wherein the downlink control message comprises an uplink grant.

3. The method of claim 1, further comprising obtaining an identification of the OFDM and DFTS-OFDM waveform types.

4. The method of claim 3, wherein the identification is received via RRC signaling received from the radio network node.

5. The method of claim 1, wherein the DFTS-OFDM waveform type has Discrete Fourier Transform, DFT, precoding.

6. A method in a radio network node, the method comprising:

transmitting a downlink control message to a user equipment, UE, the downlink control message having a format and having been scrambled with a radio network temporary identifier, RNTI; and receiving an uplink transmission from the user equipment, the uplink transmission using a waveform type selected from two or more waveform types including an orthogonal frequency divisional multiplexing, OFDM, and a Fourier transform spread-OFDM, DFTS-OFDM, the waveform type being selected by the UE based on a combination of the format of the downlink control message, the RNTI used to scramble the downlink control message, and a radio resource control, RRC, configuration of the UE.

7. The method of claim 6, wherein the downlink control message comprises an uplink grant.

8. A User Equipment (UE), comprising:

a receiver configured to receive a downlink control message from a radio network, the downlink control message having a format and having been scrambled with a radio network temporary identifier, RNTI;

a processor configured to select a waveform type from two or more waveform types including an orthogonal frequency divisional multiplexing, OFDM, and a Fourier transform spread-OFDM, DFTS-OFDM, for an upcoming uplink transmission to the radio network node, the waveform type being selected based on a combination of the format of the downlink control message, the RNTI used to scramble the downlink control message, and a radio resource control, RRC, configuration of the UE, wherein the format of the downlink control message includes the size of a corresponding uplink grant; and a transmitter configured to transmit the uplink transmission to the radio network node using the selected waveform type.

* * * * *